(12) United States Patent
French

(10) Patent No.: US 7,024,963 B2
(45) Date of Patent: Apr. 11, 2006

(54) DRIVE APPARATUS

(76) Inventor: Andrew French, Millenium Park Bulga Creek, Via Karuah New South Wales 2324 (AU)

( * ) Notice: Subject to any disclaimer, the term of this patent is extended or adjusted under 35 U.S.C. 154(b) by 0 days.

(21) Appl. No.: 10/399,126

(22) PCT Filed: Oct. 11, 2001

(86) PCT No.: PCT/AU01/01295

§ 371 (c)(1),
(2), (4) Date: Oct. 3, 2003

(87) PCT Pub. No.: WO02/31370

PCT Pub. Date: Apr. 18, 2002

(65) Prior Publication Data

US 2004/0041479 A1    Mar. 4, 2004

(30) Foreign Application Priority Data

Oct. 11, 2000   (AU) .................................. PR0692
Mar. 3, 2001    (AU) .................................. PR8083

(51) Int. Cl.
*F16H 37/06*      (2006.01)
(52) U.S. Cl. ................... 74/665 F; 74/DIG. 4
(58) Field of Classification Search ........... 74/665 F, 74/665 G, 665 H, 665 P, 434, DIG. 4
See application file for complete search history.

(56) References Cited

U.S. PATENT DOCUMENTS

| 2,243,555 | A | * | 5/1941 | Faus | ........................... 310/103 |
| 3,523,204 | A | * | 8/1970 | Rand | ........................... 310/94 |
| 3,730,488 | A | * | 5/1973 | Gardner, Jr. | ............. 366/262 |
| 3,731,984 | A |   | 5/1973 | Habermann | |
| 3,864,587 | A | * | 2/1975 | Landry | ....................... 310/103 |
| 4,850,821 | A | * | 7/1989 | Sakai | ......................... 417/420 |
| 5,013,949 | A | * | 5/1991 | Mabe, Jr. | ..................... 310/83 |
| 5,193,953 | A |   | 3/1993 | Jesinger | |
| 5,477,094 | A |   | 12/1995 | Lamb | |

FOREIGN PATENT DOCUMENTS

| AU | 25377/92 | 4/1993 |
| DE | 2631354 A1 | 6/1990 |
| DE | 3841012 A1 | 6/1990 |
| DE | 20007580 U 1 | 10/2000 |

(Continued)

OTHER PUBLICATIONS

Int'l Search Report, Oct. 11, 2000 issued in connection with PCT application No. PCT/AU01/01295.

*Primary Examiner*—Dirk Wright
(74) *Attorney, Agent, or Firm*—Marshall, Gerstein & Borun LLP

(57) ABSTRACT

An apparatus for inducing drive is shown that includes a primary drive shaft and four secondary drive shafts. The primary shaft and secondary shafts are fitted with magnets that are oriented such that when the primary shaft is rotated the secondary shafts are caused to rotate due to attractive or repulsive forces. The primary shaft is connected to and rotated by a rotational energy source such as a motor powered by electricity or a battery, although any source of energy to cause rotation of the primary shaft may be used. Each secondary shaft is fitted with two annular magnetic discs that are oriented to vertically support the weight of the shaft (and any attachments/fittings thereto) above the alternating or generating device. The discs can be arranged to provide either an attractive or repulsive magnetic force between them.

34 Claims, 16 Drawing Sheets

| | FOREIGN PATENT DOCUMENTS | | |
|---|---|---|---|
| EP | 88909 B1 | 9/1983 | |
| EP | 655637 A1 | 5/1995 | |
| EP | 977343 A1 | 2/2000 | |
| EP | 979945 A2 | 2/2000 | |
| FR | 2546253 | 11/1984 | |
| JP | 60-091011 A | 5/1985 | |
| JP | 50304763 A | 11/1993 | |
| WO | WO 00/21184 A1 | 4/2000 | |
| WO | WO 00/50719 A1 | 8/2000 | |
| WO | WO 00/64031 A1 | 10/2000 | |

\* cited by examiner

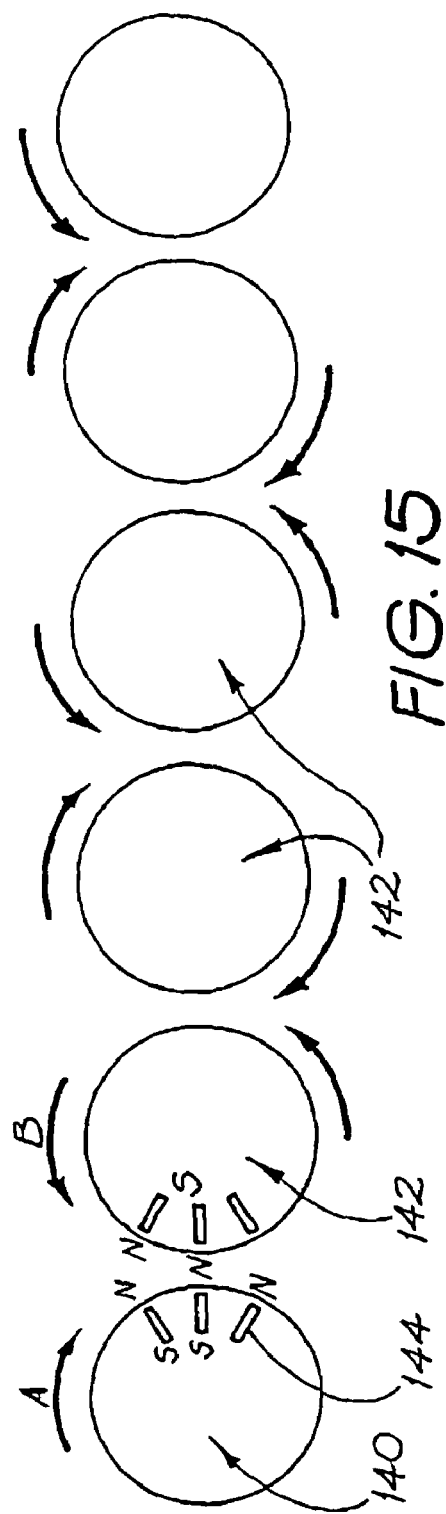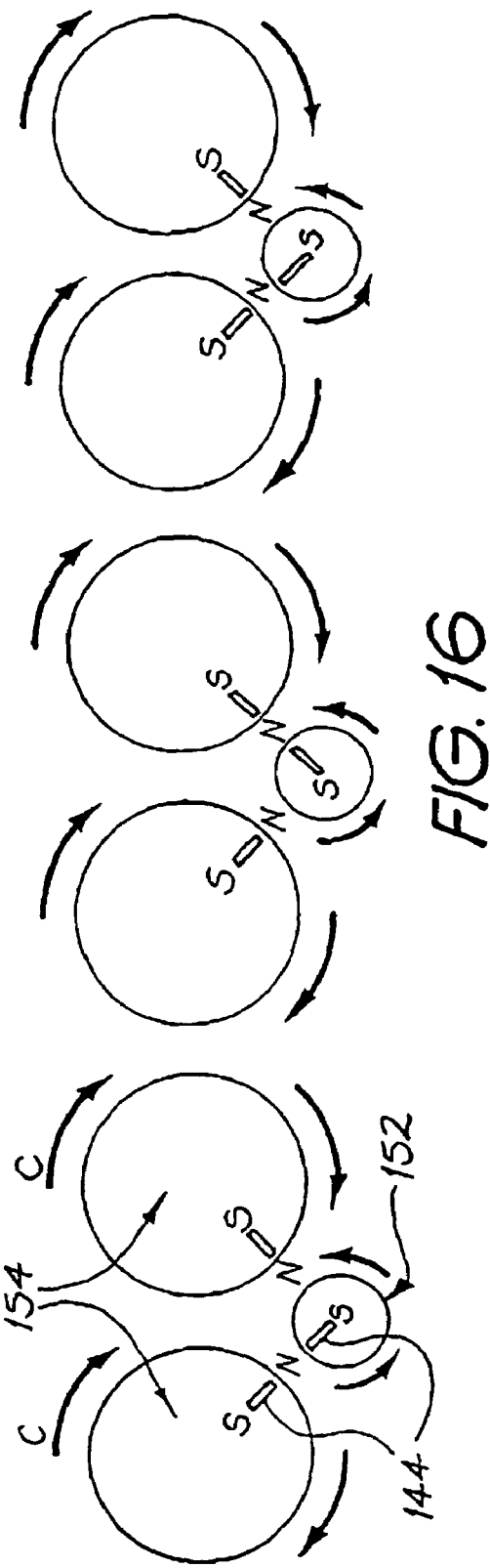

DRIVE APPARATUS

FIELD OF THE INVENTION

The present invention relates to an apparatus for inducing drive. The device can be applied to induce drive in secondary drive shafts in response to the rotation of a primary drive shaft and will primarily be described with reference to this context. It should be remembered, however, that the invention has broader use in drive induction applications for all manner of shapes of rotatable objects.

BACKGROUND ART

Known methods of transferring drive from engines and motors to gearboxes, pumps, alternators, generators and compressors is accomplished by various forms of physical coupling including pulley belts, chains, gears, disks, cogs, diaphragm and viscous fluid type couplings. There are many problems associated with mechanical couplings, such as the requirement for periodic lubrication of gears, close alignment requirements of disc, diaphragm and hydraulic couplings and the limited life of elastomer and rubber element couplings. Energy losses in the form of friction and heat loss can be considerable in such apparatus.

SUMMARY OF THE INVENTION

The present invention in a first aspect provides apparatus for inducing drive including a primary drive shaft and one or more secondary drive shafts, the primary shaft and secondary shaft(s) each fitted with magnetic means oriented such that, when the primary shaft is rotated, the or each secondary shaft is caused to rotate due to attractive or repulsive magnetic forces.

One advantage of the present drive apparatus over those known in the art involving conventional mechanical couplings is that there are minimal frictional or heat losses because the or each secondary drive shaft is not in physical contact with the primary shaft. Further, a mechanical advantage can be created by positioning a number of secondary shafts in proximity to the primary shaft, so that one shaft induces rotation in a plurality of secondary shafts simultaneously.

In this regard, in a second aspect the present invention provides apparatus for inducing drive including a primary drive shaft and a plurality of secondary drive shafts arranged around the primary drive shaft, the primary shaft and the secondary shafts each fitted with magnetic means oriented such that when the primary shaft is rotated the secondary shafts are caused to rotate due to attractive or repulsive magnetic forces.

Preferably in the second aspect the secondary drive shafts are spaced evenly around the primary drive shaft, and longitudinal axes of the secondary drive shafts are parallel to a longitudinal axis of the primary drive shaft.

Preferably the primary drive shaft in both the first and second aspects is connected to and rotated by a rotational energy source.

Preferably the or each secondary shaft is connected to an electric current alternating or generating device.

Preferably the magnetic means is a permanent magnet or electromagnet positioned on each of one or more arms which extend radially out from each of the primary and secondary drive shafts.

Preferably the or each secondary shaft is located a sufficient distance from the primary shaft such that the or each arm and associated magnet positioned on each respective shaft cannot come into direct contact with each other arm/magnet.

Preferably the or each secondary shaft is fitted with an additional mass to increase its rotational inertia.

In this regard, in a third aspect the present invention provides apparatus for inducing drive including a primary drive shaft and one or more secondary drive shafts, the primary shaft and secondary shaft(s) each fitted with magnetic means oriented such that, when the primary shaft is rotated, the or each secondary shaft is caused to rotate due to attractive or repulsive magnetic forces, with the secondary shaft(s) each being fitted with an additional mass to increase its rotational inertia.

By increasing the rotational inertia of each secondary shaft, once it is caused to rotate by the primary shaft, its tendency is to continue to rotate. It has been observed that this enhances the performance of the apparatus and makes for a smoother induction of drive from the primary shaft to the secondary shaft(s).

Preferably for all three aspects the mass is positioned at an in use upper end of the or each secondary shaft.

Preferably the or each secondary shaft is fitted with a second magnetic means oriented so as to vertically support the weight of the shaft (and any attachments/fittings thereto) above the alternating or generating device.

Preferably the second magnetic means comprises at least two annular magnetic discs, a first disc being positioned on the secondary shaft, and a second other disc being positioned intermediate the first disc and the alternating or generating device, and wherein the discs are oriented so as to provide a repulsive magnetic force between them.

Preferably the second disc is supported at a support, a predetermined height above surrounding ground.

Preferably in the first and third aspects a plurality of secondary shafts are spaced evenly around a central primary shaft and such that the or each arm and associated magnet positioned on each respective secondary shaft cannot come into direct contact with the arm/magnets of any other secondary shaft or those arm/magnets of the primary shaft.

Preferably longitudinal axes of the secondary shafts are parallel with a longitudinal axis of the primary shaft.

In one variation of the first aspect, the primary shaft and the secondary shaft can each have a peripheral ring of magnets arranged at one end respectively thereof, with one of the peripheral rings being either:

(i) positionable within or adjacent to the other peripheral ring; or (ii) alignable with an outer lateral face of the other peripheral ring;

to transfer rotation from the primary shaft to the secondary shaft.

Preferably one of the shafts additionally has a central magnet at the end thereof which in (i) is located centrally within the ring.

Preferably in (ii) a longitudinal axis of the primary shaft is orthogonal to a longitudinal axis of the secondary shaft.

In another variation of the first aspect, one of the primary or secondary shafts has a motive mechanism associated therewith for transferring a motive force to or receiving a motive force from another source. In one embodiment the motive mechanism is a screw mechanism and the other source is a fluid that can engage with the screw mechanism to be driven thereby or to drive the same. In this regard the fluid can be a liquid such as water. However, the fluid can also be a gas such as steam or a flowable solid (eg. the screw mechanism can be an auger).

Further, it is preferred that the motive mechanism is located within an elongate housing (such as a pipe or tube) through which the fluid flows.

In this regard, in a fourth aspect the present invention provides apparatus for inducing drive including a primary drive shaft and one or more secondary drive shafts, the primary shaft and secondary shaft(s) each fitted with magnetic means oriented such that, when the primary shaft is rotated, the or each secondary shaft is caused to rotate due to attractive or repulsive magnetic forces, with one of the primary or secondary shaft(s) having a motive mechanism associated therewith for transferring a motive force to or receiving a motive force from another source.

Preferably in the fourth aspect the motive mechanism and other source are as defined above for the other variation of the first aspect.

An advantage of the fourth aspect of the present invention is that the motive mechanism can, for example, provide a drive for a fluid or can be driven by that fluid, with the primary and secondary shafts facilitating a coupling to the motive mechanism. Thus, a motor connected to one shaft can drive the motive mechanism connected to the other, or the motive mechanism can receive energy and transfer it to its shaft, and that energy can then be transferred via the magnetic coupling to a generator coupled to the other shaft. The fluid can conveniently be flowing through a sealed housing such as a pipe, and thus the drive can provide a very effective and completely sealed means of transferring energy to/from a fluid.

In yet another variation of the first aspect, the primary shaft is preferably elongate having a longitudinal axis with a plurality of elongate secondary shafts, each having a longitudinal axis parallel or inclined to the primary shaft axis and to each other secondary shaft axis, being arranged in series adjacent to and extending away in the series from the primary shaft.

In this other variation, the magnetic means in the primary and secondary shafts can be oriented such that, when the primary shaft rotates in one direction, the first adjacent secondary shaft rotates in an opposite direction, the next adjacent secondary shaft rotates in a further opposite direction (same as the primary shaft), and so on. Alternatively, the magnetic means can be oriented such that the primary shaft and all secondary shafts rotate in the same direction.

In a further embodiment of this other variation, one primary shaft can be associated with two secondary shafts to define a combination, and the magnetic means can be oriented such that the secondary shafts in the combination rotate in the same direction, and a plurality of such combinations can be arranged in series, for example, where the secondary shafts of each combination are in series, and axes of all the secondary shafts in all of the combinations are parallel or inclined.

This other variation of the invention can define, for example, a conveying system (i.e. where all the secondary shafts define rollers of the conveying system), or a mechanical thrasher or separator for agricultural applications (i.e. where the secondary shafts define counter rotating pairs of shafts in the thrasher or separator etc).

In this regard, in a fifth aspect the present invention provides apparatus for inducing drive including a primary elongate drive shaft having a longitudinal axis, and a plurality of secondary elongate drive shafts each having a longitudinal axis parallel or inclined to the primary shaft axis and to each other secondary shaft axis, with the secondary shafts being arranged in series adjacent to and extending away in the series from the primary shaft, the primary shaft and secondary shafts each fitted with magnetic means oriented such that, when the primary shaft is rotated, the secondary shafts are caused to rotate due to attractive or repulsive magnetic forces.

In yet a further variation of the first aspect, the magnetic means on the primary shaft can be spaced from a longitudinal axis thereof by a different or variable distance to the spacing of the magnetic means from a longitudinal axis of the secondary shaft(s). This enables different rotational ratios in the coupling of the primary shaft to the secondary shaft, for example, to either step up or step down rotational speeds between the primary and secondary shaft(s).

In a sixth aspect, the present invention provides apparatus for vertically supporting the weight of a shaft, the apparatus including a magnetic means having at least two magnets, a first magnet being mountable on the shaft and a second magnet being locatable with respect to the first magnet to maintain it in a vertical position by either an attractive or repulsive magnetic force between them.

Preferably the magnetic means is a permanent magnet or electromagnet.

Preferably the magnets are annular discs, the first disc positioned on the shaft, and the second other disc also positioned on the same shaft and intermediate the first disc and an alternating or generating device positioned at a lower end of the shaft.

Preferably the shaft of the sixth aspect is the secondary shaft of the first aspect and preferably the magnetic means of the sixth aspect is the second magnetic means of the first aspect.

In a seventh aspect the present invention provides apparatus for inducing drive including a primary shaft fitted with magnetic means and locatable within a housing, and a plurality of individually activatable electromagnets arranged around the housing, and which can be activated in sequence such that by attractive or repulsive magnetic forces imparted to the magnetic means they cause the primary shaft to rotate within the housing.

Preferably the housing is an elongate pipe or tube, with the primary shaft extending longitudinally therethrough.

Preferably the magnetic means is a peripheral ring of magnets arranged at one end of the primary shaft. Optionally, a motive mechanism can be associated with the primary shaft, being a mechanism as defined above.

In an alternative variation of the seventh aspect, the motive mechanism can be used to transfer a rotational force to the primary shaft, which can in turn be transferred to the magnetic means to rotate the same, and one or more conductive coils can be arranged around the outside of the housing such that an electrical current can be imparted thereto by the moving magnetic means. In this regard, the drive inducing apparatus can be configured to operate as an alternator/generator.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIG. 15 shows an end view of a further embodiment of apparatus for inducing drive in accordance with the invention.

FIG. 16 shows an end view of a further embodiment of apparatus for inducing drive in accordance with the invention.

MODES FOR CARRYING OUT THE INVENTION

Figure 1:
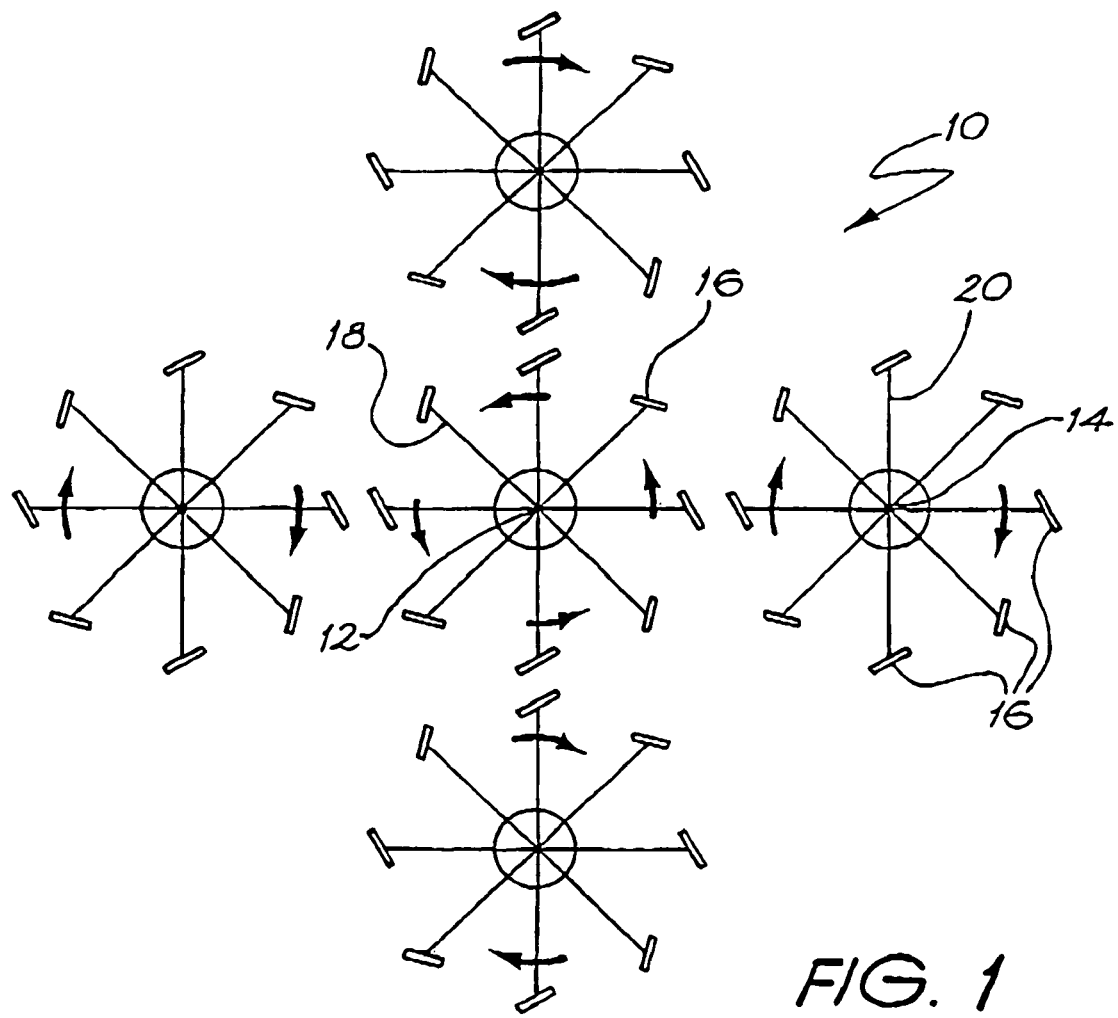
FIG. 1 shows a plan view of one embodiment of an apparatus for inducing drive in accordance with the invention.

Referring to the drawings, apparatus for inducing drive 10 is shown in FIG. 1 and includes a primary drive shaft 12 and four secondary drive shafts 14 spaced evenly around shaft 12. The primary shaft 12 and secondary shafts 14 are each fitted with magnetic means, typically in the form of permanent magnets 16 which are oriented such that when the primary shaft 12 is rotated the secondary shafts 14 are caused to rotate due to either attractive or repulsive magnetic forces (either directional force works). The primary shaft 12 is connected to and rotated by a rotational energy source such as a motor 8 powered by electricity or a battery, although any source of energy to cause rotation of the primary shaft is within the scope of the invention, for example rotation by connection to a water wheel, windmill, wave energy source, solar energy source, etc.

Figure 2:
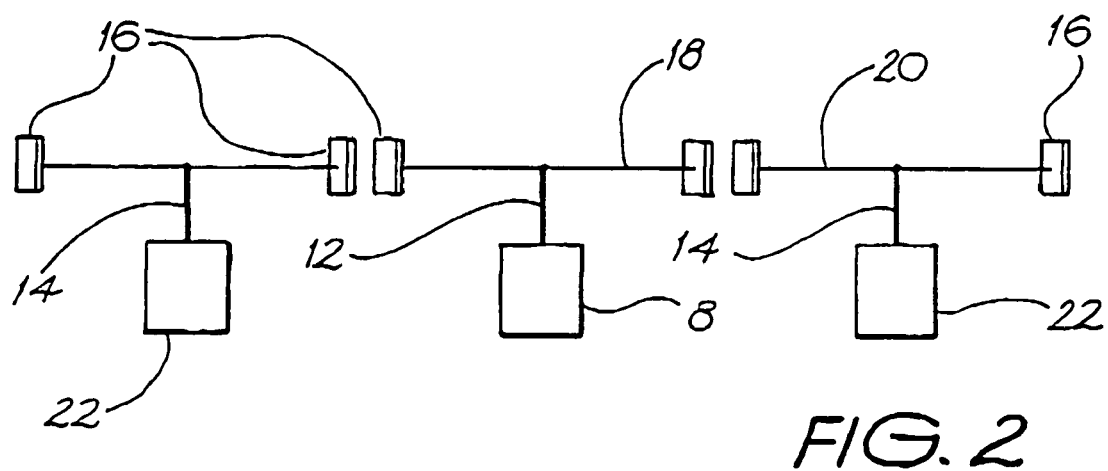
FIG. 2 shows a side view of the embodiment shown in FIG. 1.
Figure 3:
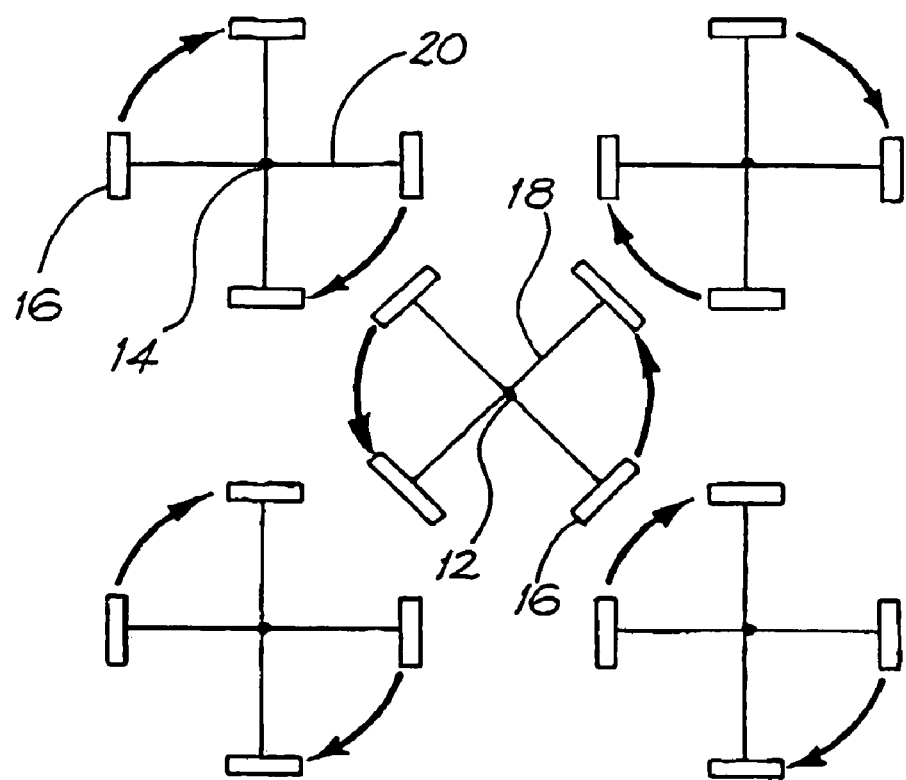
FIG. 3 shows a plan view of a further embodiment of apparatus for inducing drive in accordance with the invention.

The magnetic means can also comprise an electromagnet or any other magnetisable material, for example metals such as iron, formed into any convenient shape. As shown in FIGS. 1 and 2 the magnets 16 are in the shape of blocks positioned on the end of each of eight arms 18, 20 which extend radially out from each of the primary 12 and secondary drive shafts 14 respectively. Typically the magnets are fastened in place by means of a clamp or similar fastening device or tie. The secondary shafts 14 and their associated arms 20 are located a sufficient distance from the primary shaft 12 and its associated arms 18 such that none of the arms and associated magnets positioned on each respective shaft can come into direct contact or collision with each other. Typically the arms and associated magnets are co-planar (in the horizontal plane) as shown in FIG. 2, although some vertical separation between the magnets does not materially affect the operation of the apparatus 10. In other embodiments the primary and secondary shafts can be oriented orthogonally to one another, with the magnets in the respective associated arms of each shaft aligned in such a way as to maximise repulsion forces (eg north poles aligned so as to be facing, etc).

Typically each of the secondary shafts 14 are connected to an electric current alternating or generating device 22. (Direct drive power can be inverted to produce AC power in a subsequent stage, if necessary). However, if drive is being transferred from the primary to each secondary shaft, the device 22 can be a gearbox, gear, pulley etc. or another portion of the driveshaft mechanism. In use as the primary shaft 12 is caused to rotate, the secondary shafts will also be turned by the induced magnetic attraction or repulsion forces set up between the magnets 16 located on respective arms 18 and 20 as the magnets come into close proximity with one another. As the secondary shafts 14 are turned a current can be generated, or alternatively the shafts rotate gears etc of mechanical apparatus which requires transferred energy input in order to operate, for example, mills, pumps, conveyer belts, etc. The secondary shaft can be arranged to directly drive other devices such as a pump for pumping a fluid, a compressed air generator, for example to operate power tools, or a refrigerator, and these are not limiting examples.

Figure 4:
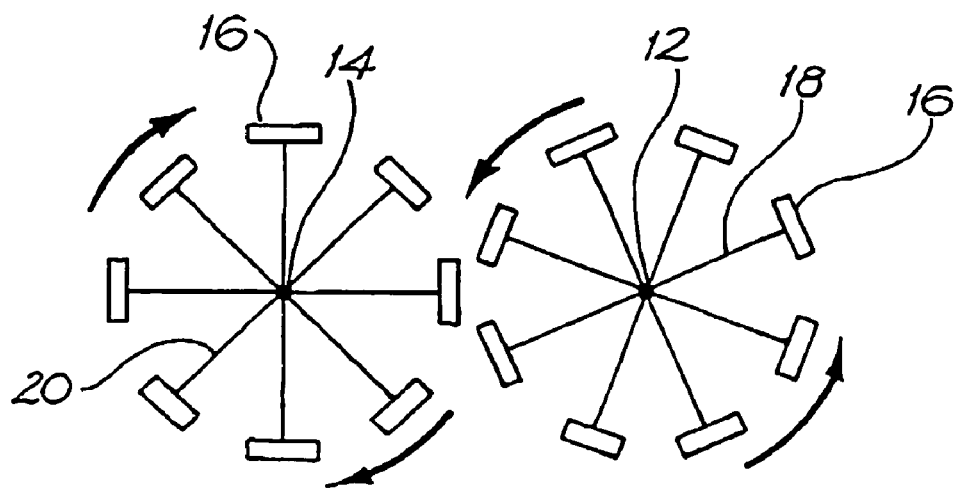
FIG. 4 shows a plan view of a further embodiment of apparatus for inducing drive in accordance with the invention.

In further embodiments shown in FIGS. 3 to 7, the number of secondary shafts 14 surrounding a central primary shaft 12 can be varied and only depends on the size of and the length of the magnet support arms 18, 20 associated with the respective shafts. There can be any number of magnets 16 and support arms 20 fitted to each secondary shaft 14. There is no requirement that there be an equivalent number of arms 18, 20 attached to primary shaft 12 and to secondary shaft 14 respectively, nor that the arms be radially extending from the secondary shafts 14 (an alternative embodiment example being shown in FIG. 7 involving a triangle of support arms with peripherally positioned magnets). Some applications may only require one secondary shaft 14, as shown in FIG. 4. The secondary shafts also need not be evenly spaced around the primary shaft.

In still further embodiments the primary shaft 12 and to secondary shaft 14 can each be fitted with an orthogonal disc which includes a peripheral ring of magnets rather than having lateral individual support arms 18, 20 bearing terminal magnets. Such an embodiment is shown, for example, in FIG. 7A.

Figure 6:
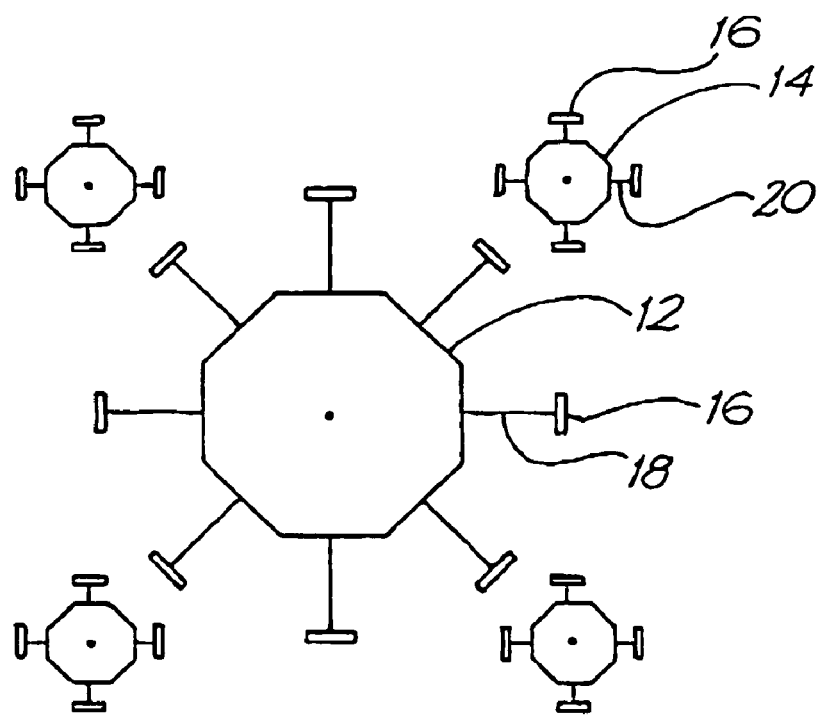
FIG. 6 shows a plan view of a further embodiment of apparatus for inducing drive in accordance with the invention.
Figure 7:
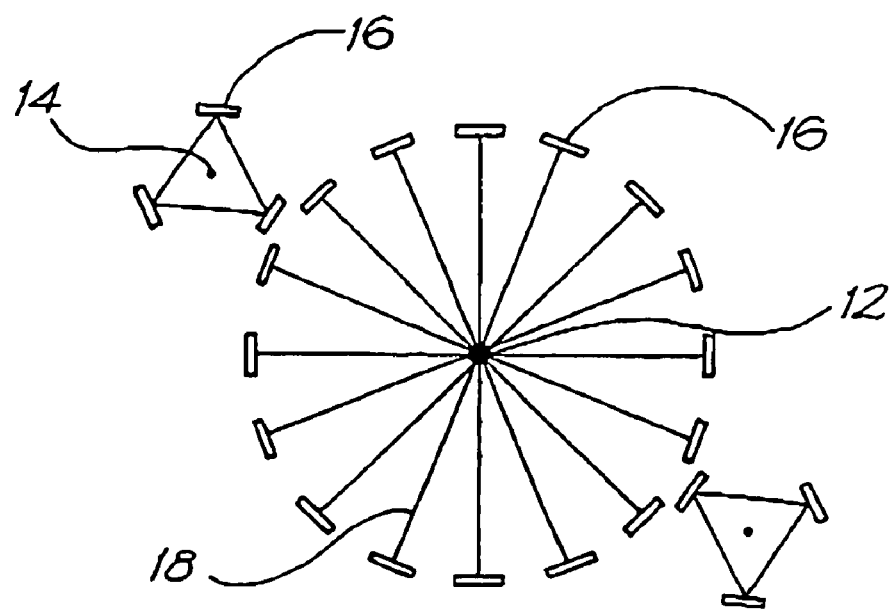
FIG. 7 shows a plan view of a further embodiment of apparatus for inducing drive in accordance with the invention.
Figure 7A:
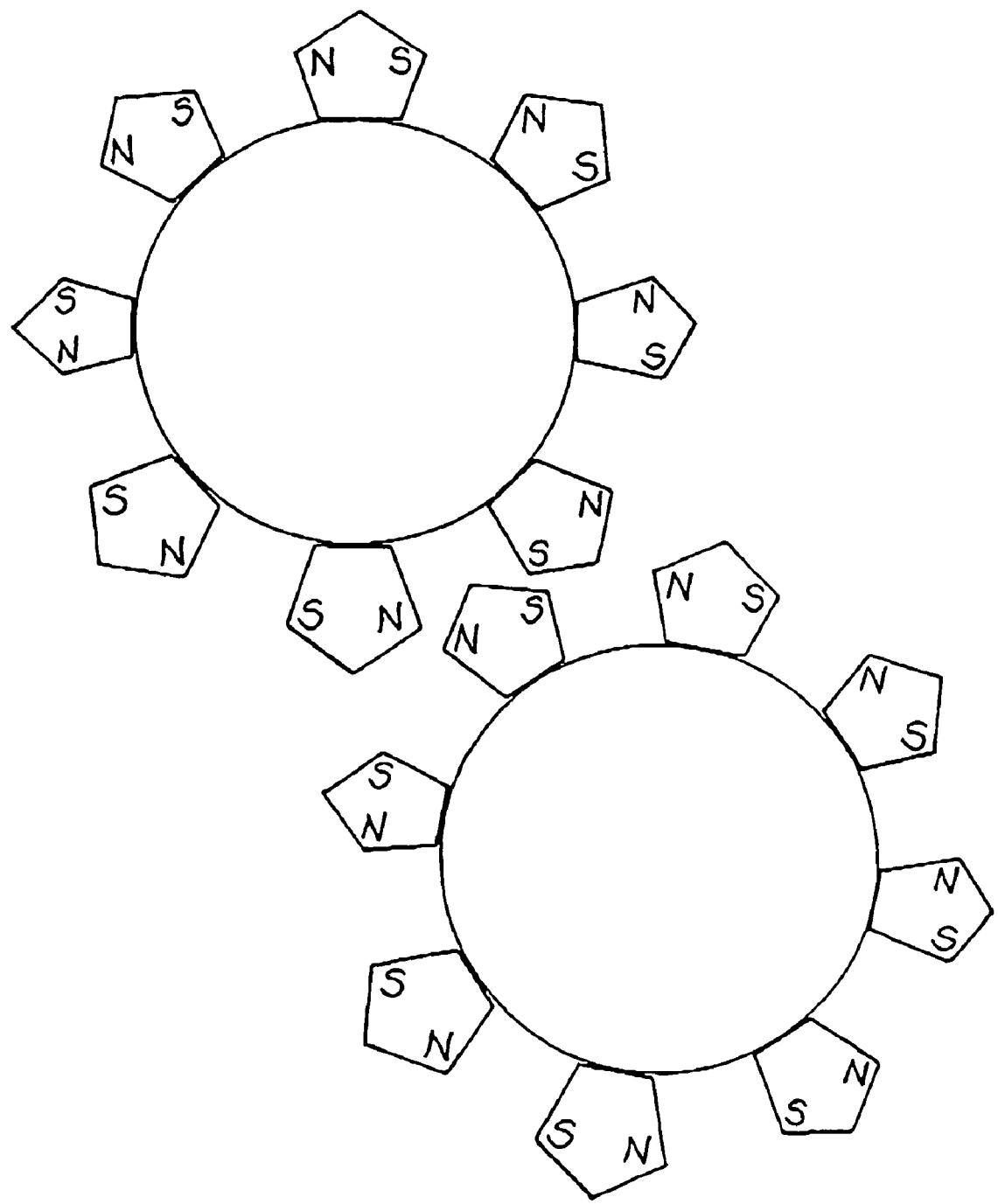
FIG. 7A shows a plan view of a further embodiment of apparatus for inducing drive in accordance with the invention.

The magnets 16 can be oriented into any position so that when the primary shaft 12 is rotated the secondary shaft/s 14 are caused to rotate due to attractive or repulsive magnetic forces. In the case of repulsive magnetic forces, typically the north pole of a magnet attached to the primary shaft comes into close proximity to the north pole of a magnet attached to the secondary shaft, and the latter magnet is repelled, causing rotational motion of the secondary shaft. An equivalent effect can be achieved if the south poles of the two respective magnets are brought into close proximity. It is also possible that a pole of a magnet attached to the primary shaft comes into close proximity to the opposing pole of a magnet attached to the secondary shaft, and the latter magnet is attracted, causing rotational motion of the secondary shaft. It has also been shown in experiments that, if the sequential magnets attached to the primary shaft are alternated in their polarity orientation, the secondary shaft magnets (which are not alternated in their polarity orientation) may first be repelled and then attracted by the primary shaft magnets as they move by, again leading to rotational motion of the secondary shaft due to a repeated combination of attraction and repulsion forces. The magnets can be located with their north-south axis arranged in a radial direction with respect to the axis of rotational movement of the shaft(s) (for example, as shown in FIG. 6) or oriented orthogonally to such a radial alignment (as shown in FIG. 7A).

The magnetic means can be located at any position along the length of shafts 12 and 14 so that the ends of the shaft protrude and thus the shaft 14 can be connected to devices 22 located at one or both ends.

It has been found that, when the secondary shaft 14 is fitted with an additional mass 24 (FIG. 8) to increase its rotational inertia, the operation of the apparatus 10 is optimized. Typically in use the mass 24 is positioned at an upper end of each secondary shaft when these shafts are oriented in a vertical direction. Multiple masses can also be fitted to the or each secondary shaft to give a similar effect, for example at either end when such shafts are oriented horizontally.

Figure 9:
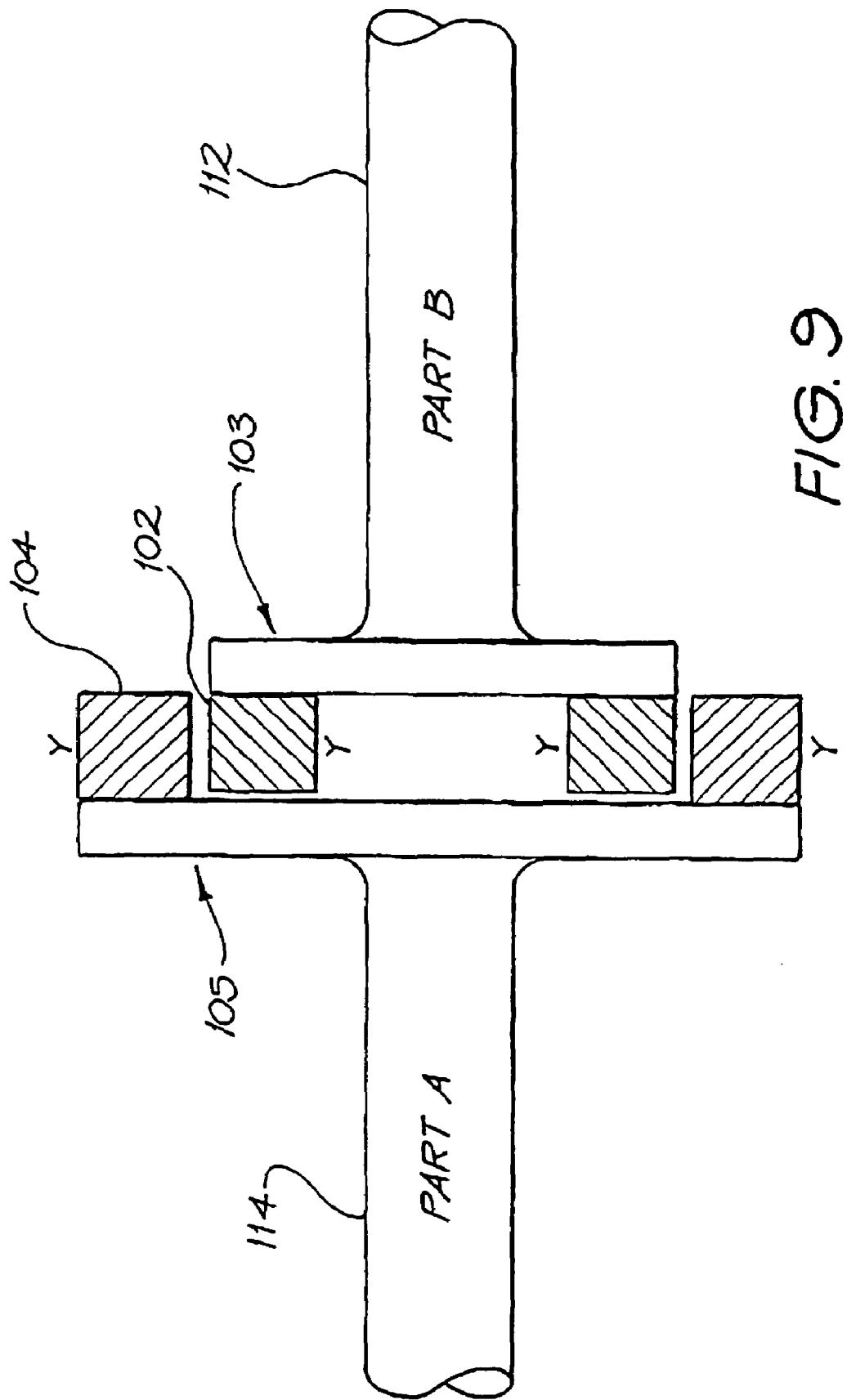
FIG. 9 shows a side view of one embodiment of an apparatus for inducing drive in accordance with the invention.
Figure 10:
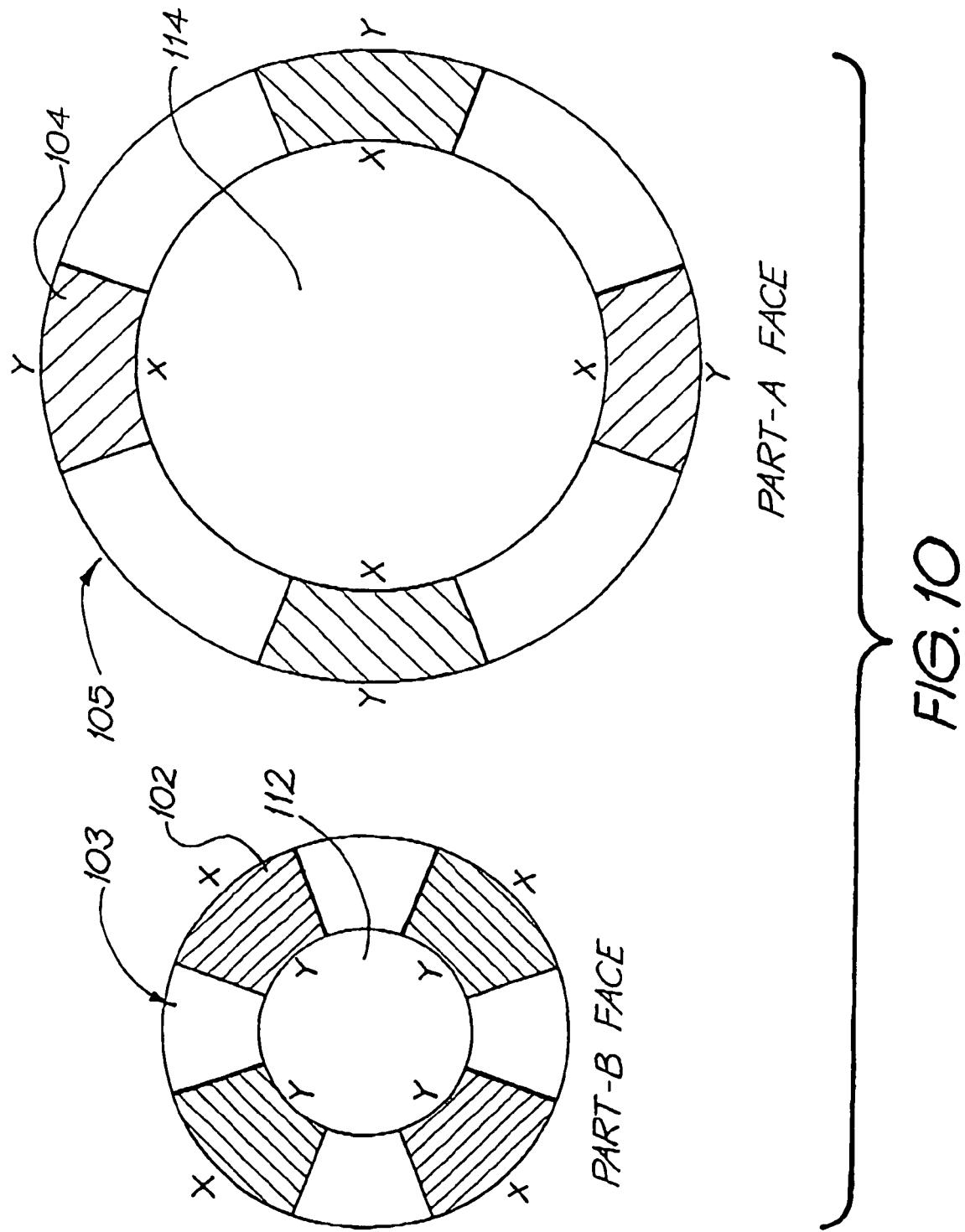
FIG. 10 shows an end view of each component of the embodiment shown in FIG. 9.
Figure 11:
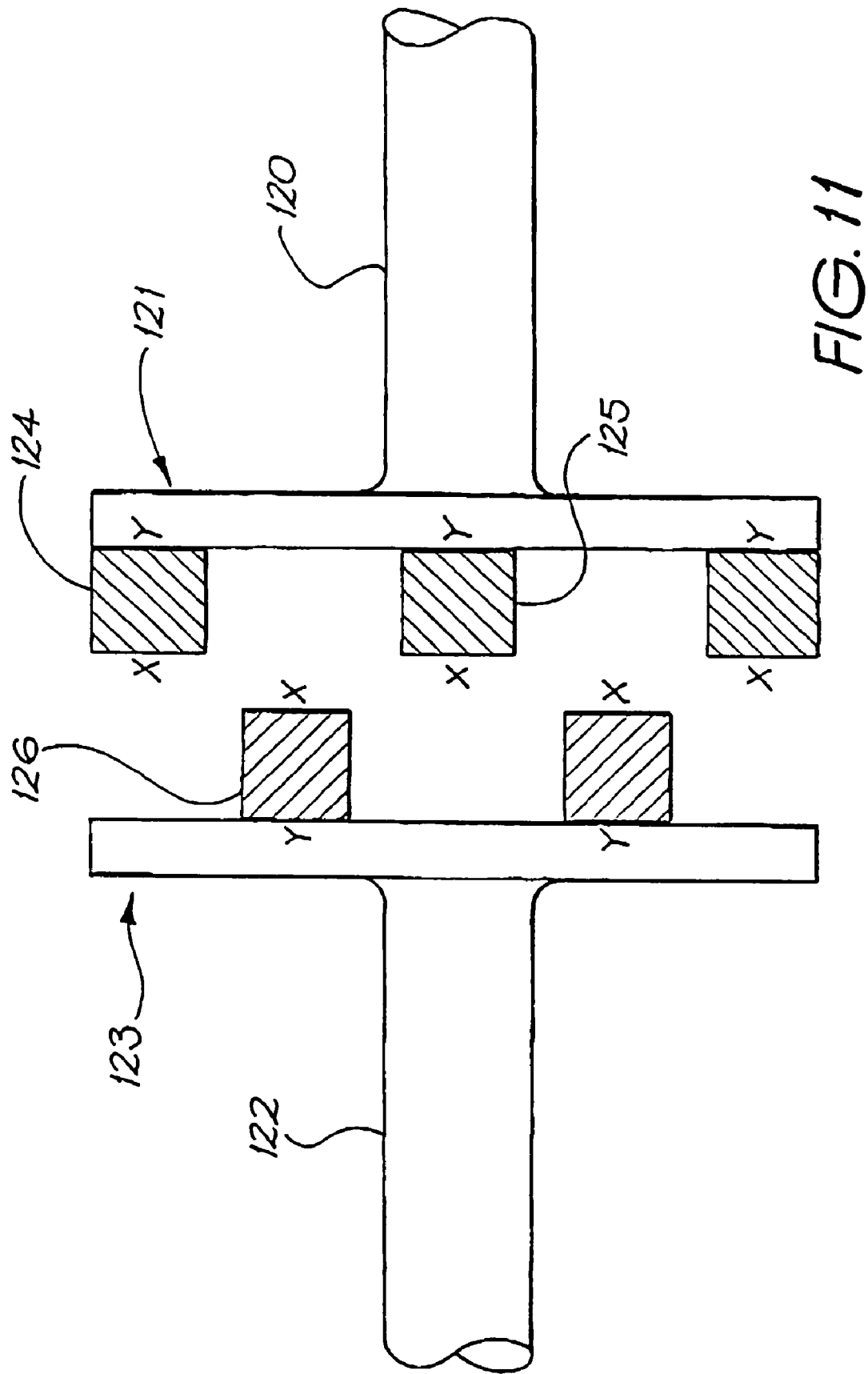
FIG. 11 shows a side view of a further embodiment of apparatus for inducing drive in accordance with the invention.

Referring now to FIGS. 9 to 12, the primary shaft 112 and the secondary shaft 114 can each have a peripheral ring 102, 104 of magnets arranged respectively at a flanged end 103, 105 of each shaft 112, 114. In use these flanged ends 103, 105 are positioned so as to face one another. The ring of magnets 104 shown in FIG. 9 is positionable within the peripheral ring of magnets 102. In FIG. 11 the primary shaft 120 and the secondary shaft 122 can each have a peripheral ring 124, 126 of magnets arranged respectively at a flanged end 121, 123 of each shaft 120, 122. In use an outer lateral face of one ring of magnets 124 is aligned adjacent with an outer lateral face of the facing peripheral ring of magnets 126. Typically a central magnet 125 is positioned at the end of shaft 120 and is located centrally within the ring of magnets 124.

Figure 12:
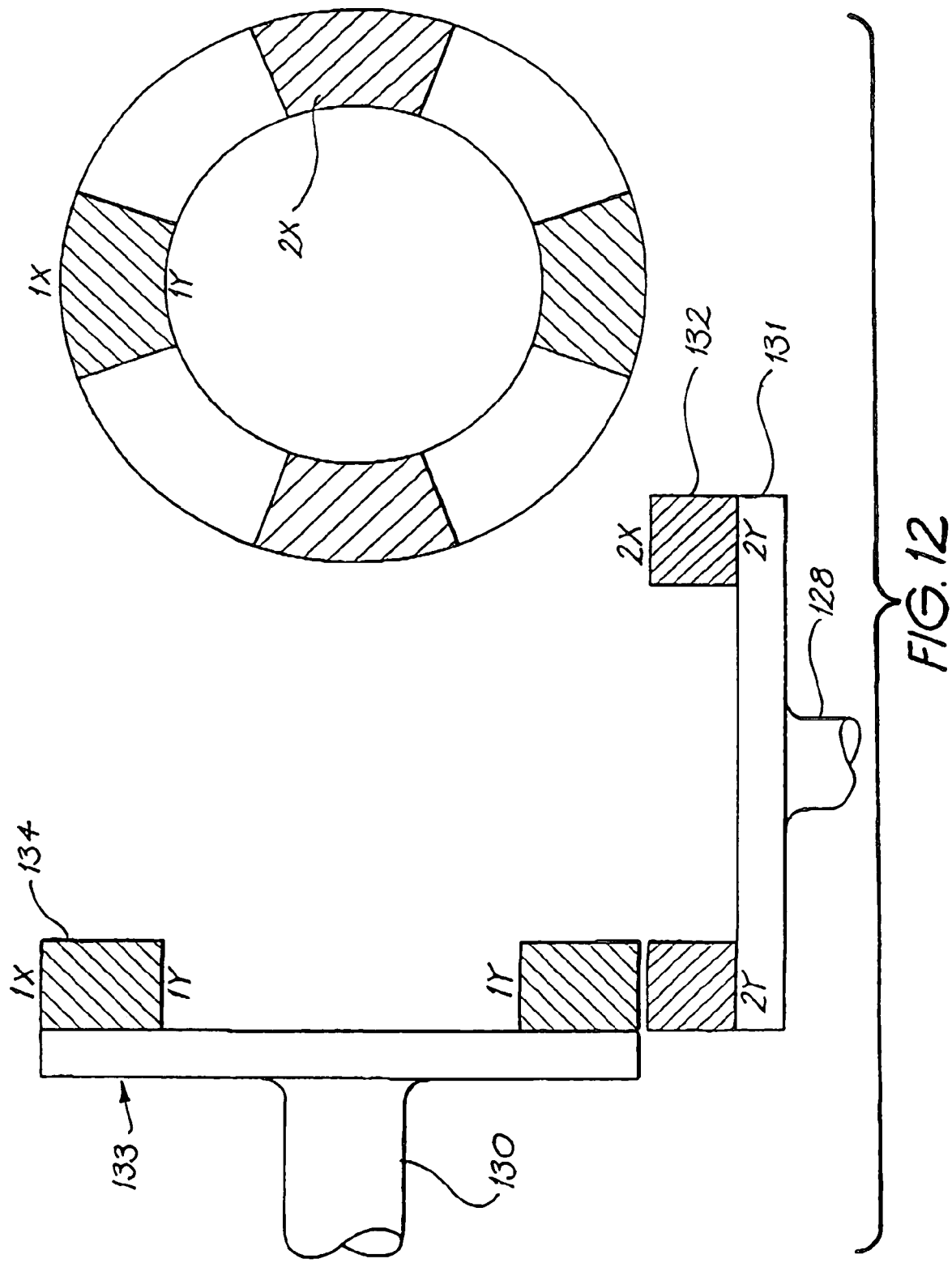
FIG. 12 shows a side view of a further embodiment of apparatus for inducing drive in accordance with the invention.

In the embodiment shown in FIG. 12 the primary shaft 128 and the secondary shaft 130 can each have a peripheral ring 132, 134 of magnets arranged respectively at a flanged end 131, 133 of each shaft 128, 130. The ring of magnets 132 shown is aligned adjacent and orthogonal to an outer lateral face of the adjacent, orthogonal ring of magnets 134.

In still further embodiments the adjoining peripheral rings of magnets can be interlocked, ie. the magnets forming each ring of magnets can be insertably received in the space between the magnets on the other, adjacent ring of magnets. In such an embodiment the magnets located on opposing rings still do not actually touch one another (being spaced apart by repulsive forces).

Figure 18:
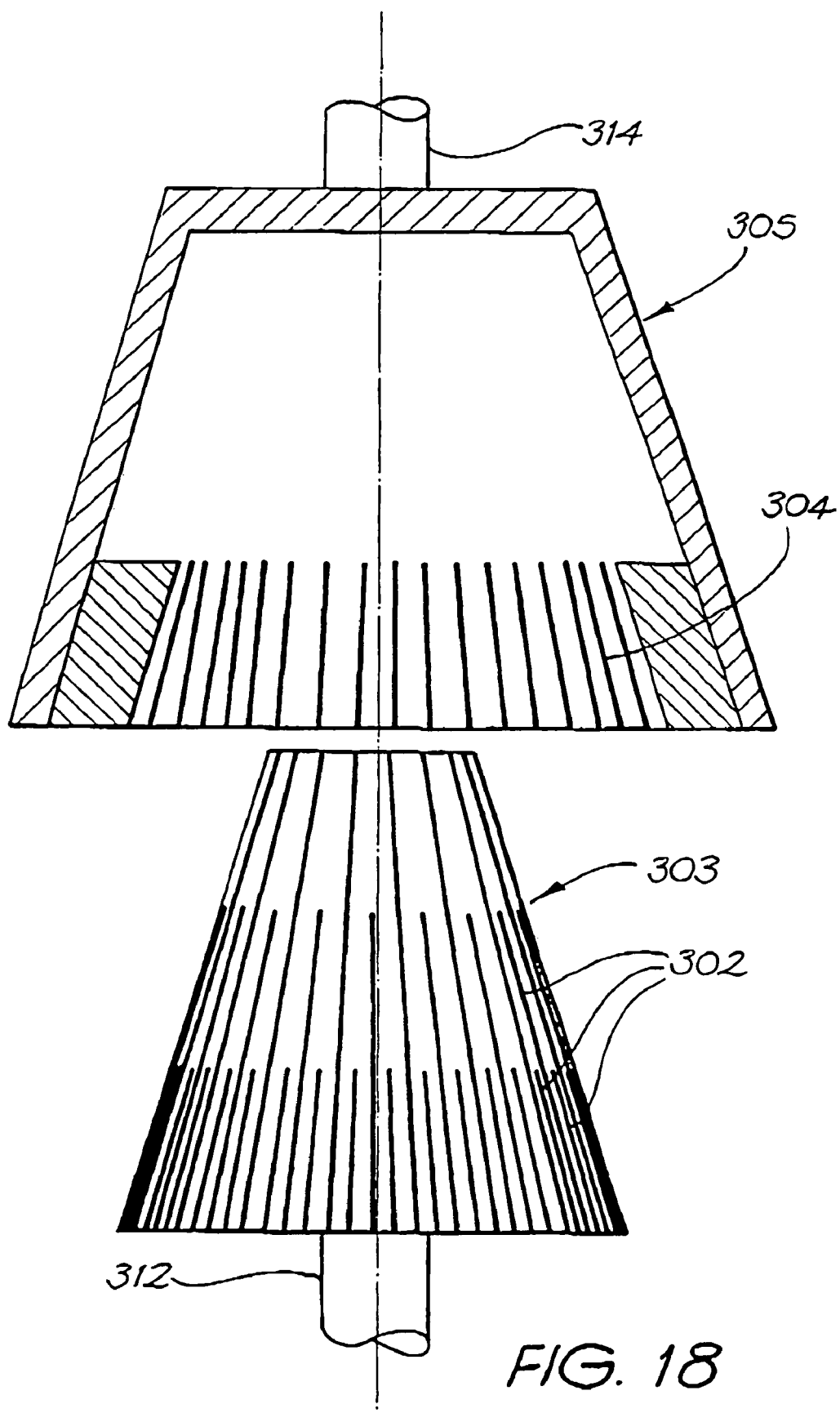
FIG. 18 shows a side view of a further embodiment of apparatus for inducing drive in accordance with the invention.
Figure 19:
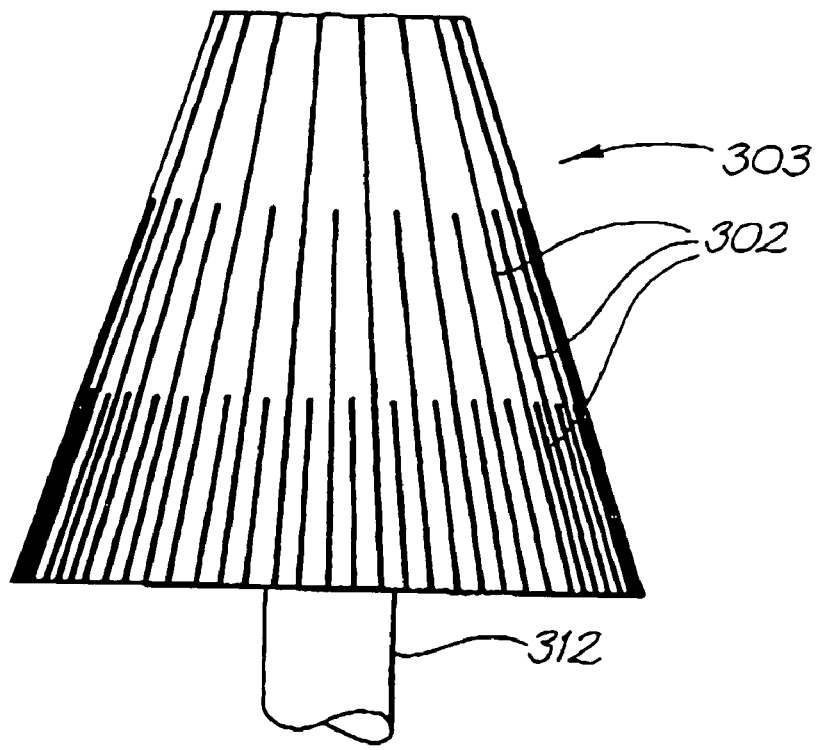
FIG. 19 shows a side view of a portion of the induced drive apparatus shown in FIG. 18.
Figure 20:
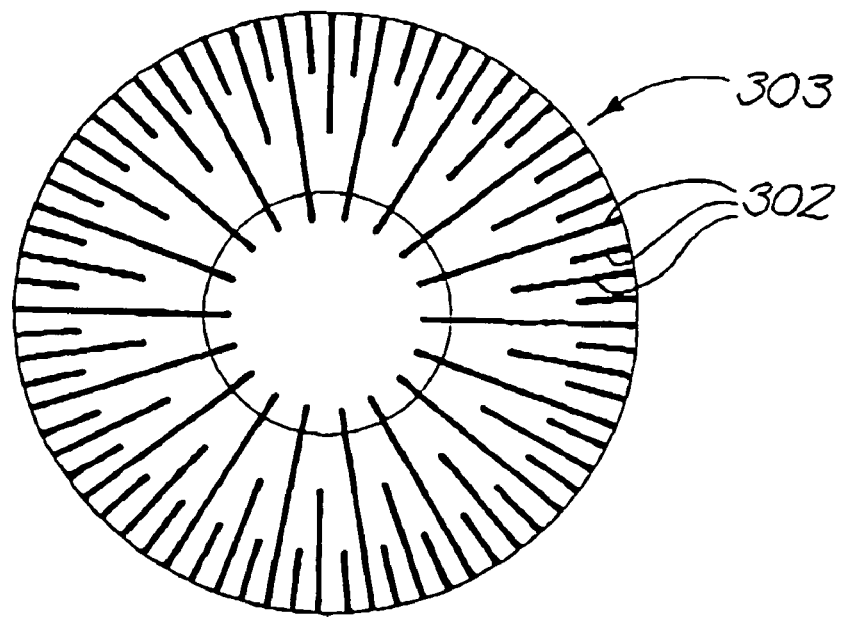
FIG. 20 shows an end view of the portion of the induced drive apparatus shown in FIG. 19.

Referring now to FIGS. 18 to 20, the primary shaft 312 and the secondary shaft 314 can each have a peripheral ring 302, 304 of magnets arranged respectively at a frustoconically-shaped end of each shaft 312, 314. In use, a frustoconically-shaped head 303 is received in a frustoconically-shaped housing 305. Rows of longitudinally arranged strips of magnetic material are spaced around the external peripheral face of the head 303 and, for example a north pole of the magnets is oriented outwardly from the head 303. Similarly, rows of longitudinally arranged strips of magnetic material are spaced around the internal peripheral face of the housing 305 and, for example, a north pole of the magnets is oriented outwardly from the internal peripheral face of the housing 305. In use these magnetic strips are positioned so as to face one another. However, importantly in this example, as the frustoconical head 303 and housing 305 each taper to a narrower portion, the number of magnets per unit surface area increases, so that the magnetic interaction between the head 303 and the housing 305 is adjustable depending on the degree to which the head 303 penetrates the housing 305. Thus the strength of the magnetic interaction is able to be adjusted by the relative axial positioning of the head 303 and the housing 305.

In each of the embodiments shown in FIGS. 9 to 12 and FIGS. 18 to 20 the magnets facilitate the transfer of rotation from the primary shaft to the secondary shaft. In each of the embodiments shown in FIGS. 9 to 12 and FIGS. 18 to 20 the primary and secondary shafts can be moved toward or away from one another to control the rotational energy conveyed therebetween by the interaction of the rings of magnets when placed in suitable proximity to one another. The apparatus can therefore function as a magnetic clutch. If the rotational movement of the secondary shaft is to be stopped for any reason, the primary and secondary shaft magnets can be moved away from one another by an external movement means, reducing the strength of the magnetic interaction. In the apparatus described, there is no necessity for the shafts to be precisely in axial alignment in order for the magnetic forces to effect movement of the secondary shaft, which can be considered an advantage over conventional clutch-type apparatus.

Figure 13:
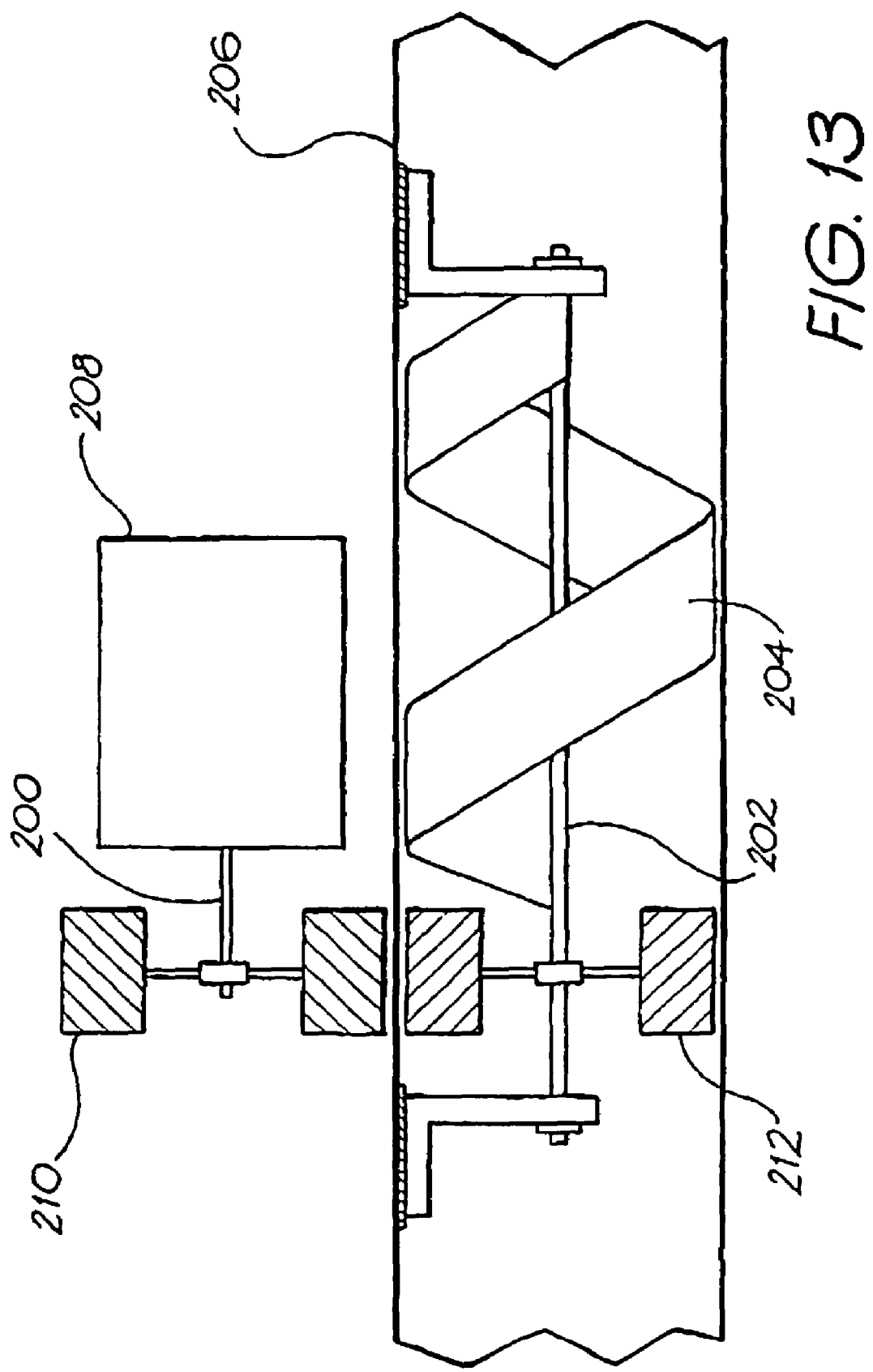
FIG. 13 shows a side view of a further embodiment of apparatus for inducing drive in accordance with the invention.
Figure 14:
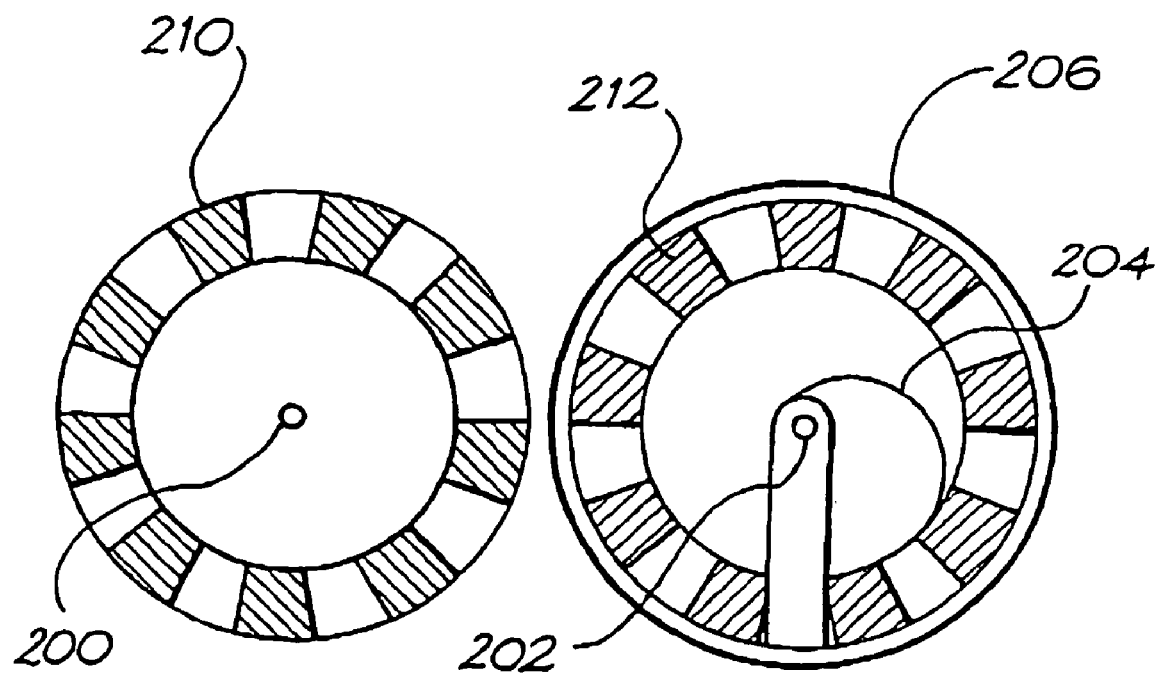
FIG. 14 shows an end view of each component of the induced drive apparatus shown in FIG. 13.

Referring now to FIGS. 13 and 14 apparatus is shown for inducing drive in a secondary drive shaft 202 from a primary drive shaft 200 where the secondary drive shaft 202 is attached to a motive mechanism in the form of a screw mechanism or worm 204 located in a pipe housing 206. The primary drive source includes a motor 208 which is attached to the primary shaft 200 which has magnets 210 fitted thereto, much as described in other embodiments in this specification. Upon rotation of the primary shaft 200 these primary magnets 210 interact with the secondary magnets 212 attached to the secondary shaft 202 and induce rotational motion of that secondary shaft 202. The secondary shaft 202 rotates as does the screw mechanism or worm 204 which is attached thereto. The screw mechanism 204 can then transfer a motive force to a fluid, a solid-fluid mixture or a flowable solid located in the housing 206, for example to effect Dumping of such a material or mixture through the housing. The fluid can include liquids (such as water) and gases (such as air or steam), and the solid can also be a flowable solid (fine particulate) material.

In further embodiments of like apparatus, the screw mechanism can receive a motive force from a flow of fluid or solid-fluid mixture etc. in the housing which can cause the secondary shaft to rotate which can, in turn, cause a magnetically induced rotation of the primary shaft for the generation of power, etc (for example in a hydroelectric generation situation). Any form of motive mechanism other than a screw mechanism or worm can also be used, for example a propeller or impeller etc rotatably fitted to the secondary shaft in the housing. In still further embodiments there is no need for the housing to be elongate in the form of a pipe; for example, an alternative flow housing can include a funnel-shaped vessel.

Such a drive can provide a very effective and completely sealed means of transferring energy to/from a flowing fluid or solid-fluid mixture. Such an apparatus can find application in situations where it is desireable to effect the transfer or mixing of fluid in a housing without physically accessing the fluid, for example if the fluid is volatile, flammable, susceptible to contamination (such as a foodstuff or medicine), toxic etc. Sometimes it is preferable for no physical breakage to be made in a pipe conveying such fluids in order to ensure that no sparks etc are likely to be generated by the opening or closing of a mechanical seal, or to prevent the leakage of certain types of fluids.

Referring now to FIGS. 15 and 16 an elongate, circular and cylindrical primary shaft 140 is aligned with a plurality of similarly shaped secondary shafts 142, the primary 140 and each secondary 142 shaft having parallel longitudinal axes. Magnetic means in the form of magnets 144 embedded in the peripheral surface of both the primary 140 and secondary 142 shafts can be oriented such that, when the primary shaft 140 rotates in one direction, the first adjacent secondary shaft 142 rotates in an opposite direction, as shown by the direction of the respective arrows A and B in FIG. 15. Furthermore, the next adjacent secondary shaft 142 rotates in a further opposite direction (same as the primary shaft 140), and so on.

Alternatively, the magnetic means can be oriented such that the primary shaft and all secondary shafts rotate in the same direction, as shown in FIG. 16. In that preferred embodiment, one primary shaft 152 can be associated with two secondary shafts 152 to define a combination, and the magnetic means can be oriented such that the secondary shafts 154 in the combination rotate in the same direction, as indicated by the arrows C. A plurality of such combinations can be arranged in series, for example, where the secondary shafts 152 of each combination are in series, and axes of all the secondary shafts 152 in all of the combinations are parallel, as shown in FIG. 16 or inclined (not in the same horizontal plane) with respect to one another. The aligned secondary shafts can thus define rollers of a conveying system for movement of articles in the direction C over the moving rollers 154. The arrangement shown in FIGS. 15 and 16 can also be utilised as part of a mechanical thresher or separator for agricultural applications (i.e. where the secondary shafts define counter-rotating pairs of shafts in the thrasher or separator etc).

Figure 5:
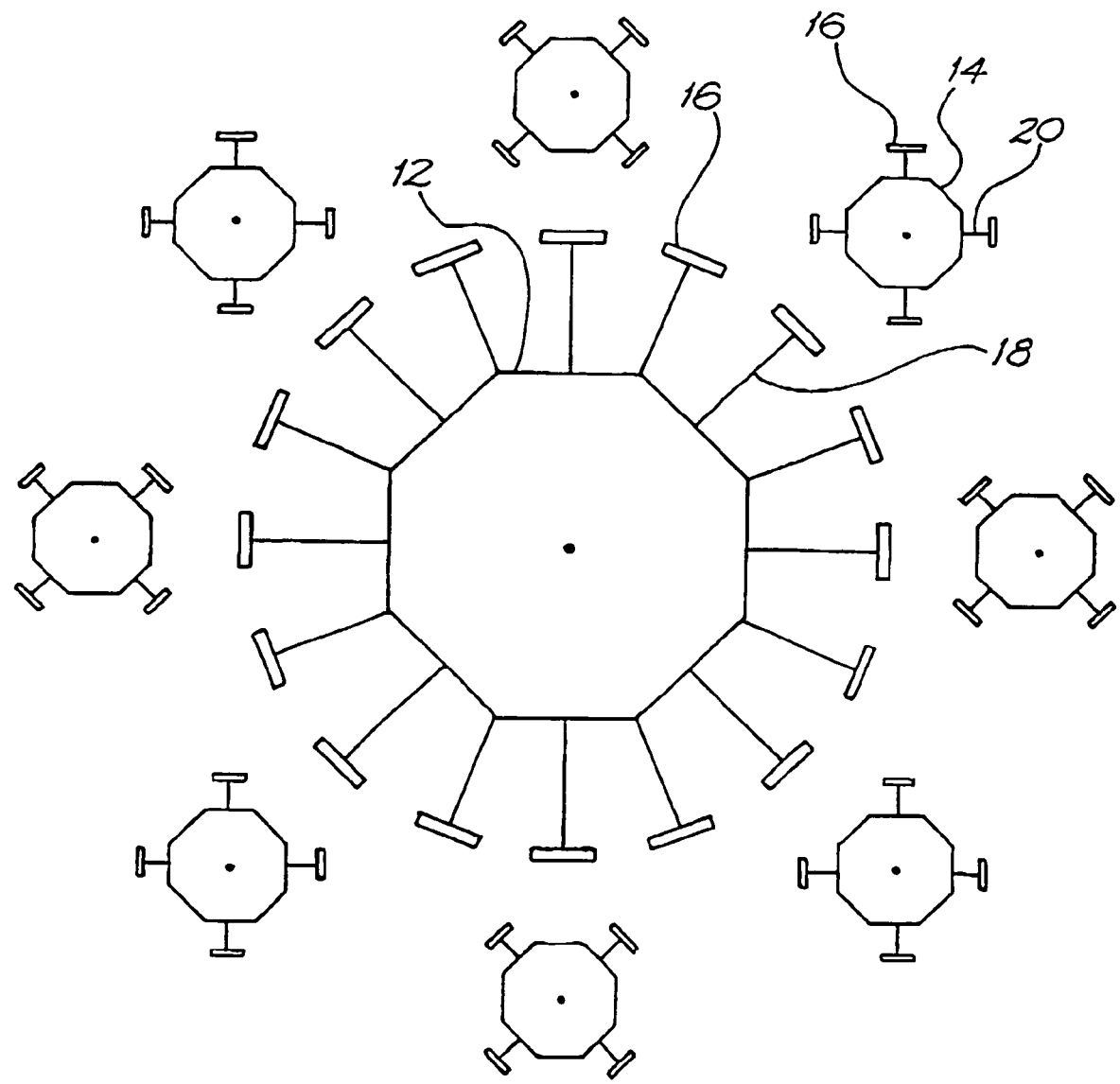
FIG. 5 shows a plan view of a further embodiment of apparatus for inducing drive in accordance with the invention.

In any one of the preceding embodiments the magnetic means joined onto the primary shaft can be radially spaced from a longitudinal axis of the shaft by a different or variable distance to the spacing of the magnetic means from a longitudinal axis of the secondary shaft(s). This enables different rotational ratios in the coupling of the primary shaft to the secondary shaft, for example, to either step up or step down rotational speeds between the primary and secondary shaft(s). Such a radial difference is shown in FIG. 5, for example, where the spacing of the magnetic means 16 from a longitudinal axis of the secondary shaft 14 is less than the spacing of the magnetic means 16 from a longitudinal axis of the primary shaft 12. The rotational speed of the secondary shaft(s) 14 is therefore likely to be faster than the rotational speed of the primary shaft 12.

Figure 8:
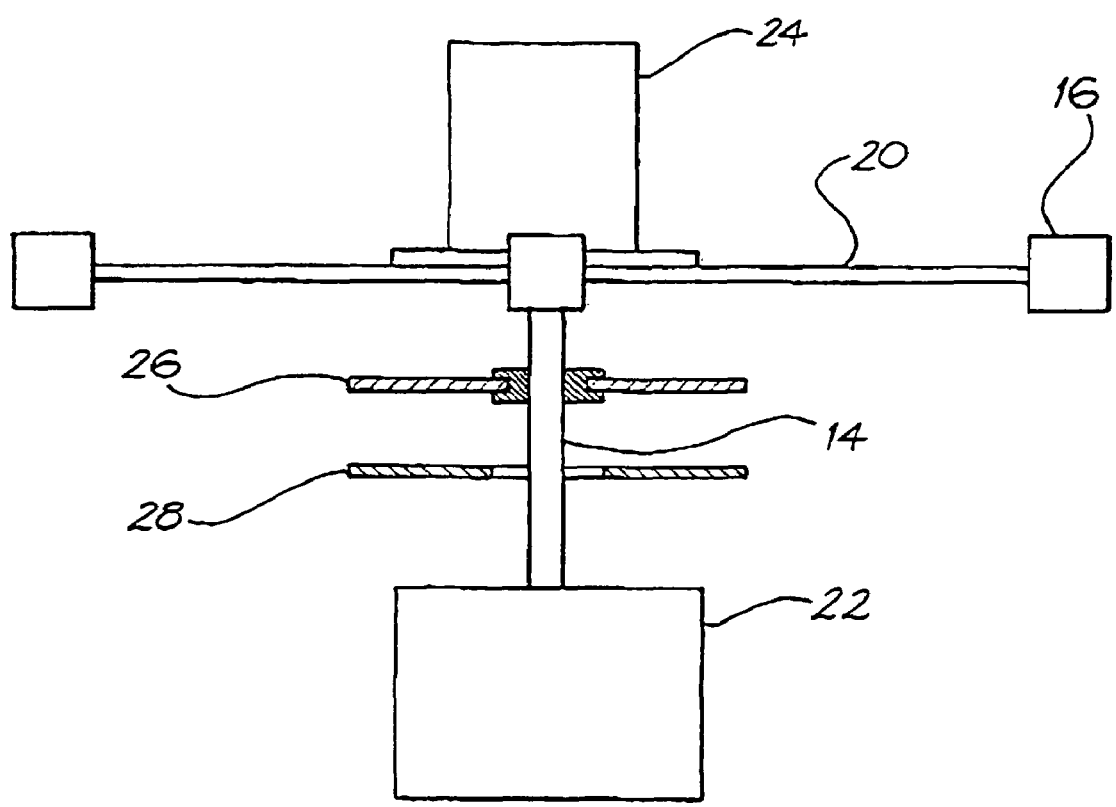
FIG. 8 shows a side view of an apparatus for vertically supporting the weight of a shaft in accordance with the invention.

Referring now to FIG. 8, each secondary shaft 14 can also be fitted with a second magnetic means, typically in the form of two annular magnetic discs 26, 28 oriented so as to vertically support the weight of the shaft 14 (and any attachments/fittings thereto such as the arms 20 and the additional mass 24) above the alternating or generating device 22. A first disc 26 is mounted on the secondary shaft 14, and a second other disc 28 is positioned around the same shaft 14 intermediate the first disc 26 and the alternating or generating device 22 (when positioned at a lower end of the shaft 14). The disc 28 is then separately supported by a suitable framework (not shown). Typically the disc 28 is located and maintained at a predetermined height above surrounding ground. The discs in the orientation shown are adapted to provide a repulsive magnetic force therebetween. However, when disc 28 is located above disc 26, the discs can be adapted to provide an attractive magnetic force therebetween.

Typically the discs 26, 28 are in the nature of permanent magnets and are made of neodynium, but can also comprise an electromagnet or another magnetisable material, for example metals such as iron, and formed into any convenient planar shape. Neodynium is preferred because it is lighter than other available heavier metal magnets. In further embodiments the discs can be replaced by magnetic or magnetisable bars or other shaped objects which are oriented so as to vertically support the weight of the shaft 14 (and any attachments/fittings thereto) above the alternating or generating device 22, and which can also prevent any lateral shift of shaft 14.

In further embodiments of the apparatus, neodynium magnets can also be attached in the position of the magnets 16 attached to the primary shaft 12, while heavier metal magnets are attached to the secondary shaft 14 as a way of further increasing the mass of each secondary shaft.

Figure 17:
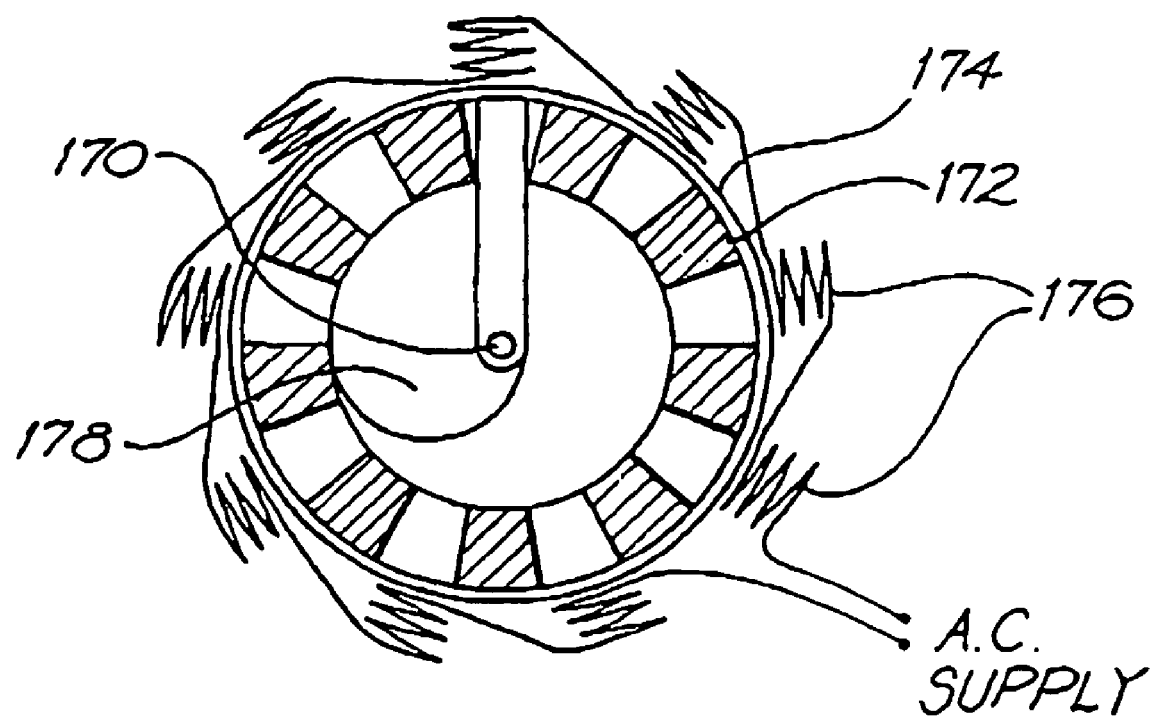
FIG. 17 shows an end view of a further embodiment of apparatus for inducing drive or inducing electricity in accordance with the invention.

Referring now to FIG. 17 apparatus is shown for inducing drive including a primary shaft 170 fitted with magnetic means in the form of peripheral magnets 172, the shaft 170 and magnets located in a housing 174. The magnets 172 are arranged at one end of the primary shaft 170 in the preferred embodiment, although in other embodiments these magnets can be located at further position(s) along the length of the primary shaft 170. The housing 174 is an elongate pipe or tube, with the primary shaft 170 extending longitudinally therethrough. A plurality of individually activatable electromagnets 176 are shown arranged around the housing 174, which can be activated in sequence by attractive or repulsive magnetic forces imparted to the peripheral magnets 172 to cause the primary shaft 170 to rotate within the housing 174. In the preferred embodiment shown in FIG. 17 this rotation turns a motive mechanism in the form of a screw turbine 178 so that fluid or a flowable solid may be moved through the housing 174.

In another preferred embodiment, the motive mechanism can be used to transfer a rotational force to the primary shaft, which in turn is transferred to rotate the magnetic means. In this example, one or more conductive coils are, instead of the electromagnets, arranged around the outside of the housing such that an electrical current can be induced in those coils by the moving magnetic means. In such an apparatus, mechanical energy can therefore be directly used for the generation of an electrical current for further use.

The advantages of the present drive apparatus over prior art conventional mechanical couplings are that there are minimal frictional or heat losses, because each secondary drive shaft is not in physical contact with the primary drive shaft. Further, when each secondary shaft is fitted with annular magnetic discs oriented so as to vertically support the weight of the shaft, frictional losses are reduced even further. A further advantage arises from the mechanical advantage that is created when a number of secondary shafts are positioned in proximity to the primary shaft so that it simultaneously induces rotation in the plurality of secondary shafts.

The materials of construction of the apparatus can comprise any suitable materials which can be shaped, formed and fitted in the manner so described, such as hard plastics or metal to give a structurally sound apparatus that can withstand high speed rotation.

The embodiments of the invention shown can provide an improved efficiency of energy transfer over the known methods of transferring drive from engines and motors to such items as gearboxes, pumps, alternators, generators and compressors without a physical or mechanical coupling to generate frictional and heat losses. Maintenance issues are also likely to be minimised when using the present apparatus. The risk of injury to persons operating such apparatus is considerably less than for apparatus featuring mechanical couplings with belts, chains, cogs and the like, because clearance is provided between all moving parts which reduces the likelihood of fingers, arms etc becoming jammed.

Whilst the invention has been described with reference to a number of preferred embodiments it should be appreciated that the invention can be embodied in many other forms.

It is to be understood that, if any prior art information is referred to herein, such reference does not constitute an admission that the information forms a part of the common general knowledge in the art, in Australia or any other country.

What is claimed is:

1. Apparatus for inducing drive including a primary drive shaft and one or more secondary drive shafts, the primary shaft and secondary shaft(s) each fitted with magnetic means oriented such that, when the primary shaft is rotated, the or each secondary shaft is caused to rotate due to attractive or repulsive magnetic forces and wherein the or each secondary shaft is fitted with an additional mass to increase its rotational inertia.

2. Apparatus as claimed in claim 1 wherein the secondary drive shaft(s) are spaced evenly around the primary drive shaft, and longitudinal axe(s) of the secondary drive shaft(s) are parallel to a longitudinal axis of the primary drive shaft.

3. Apparatus as claimed in claim 1 wherein the primary drive shaft is connected to and rotated by a rotational energy source.

4. Apparatus as claimed in claim 1 wherein the or each secondary shaft is connected to an electric current alternating or generating device.

5. Apparatus as claimed in claim 1 wherein the magnetic means is a permanent magnet or electromagnet positioned on each of one or more arms which extend radially out from each of the primary and secondary drive shafts.

6. Apparatus as claimed in claim 5 wherein the or each secondary shaft is located a sufficient distance from the primary shaft such that the or each arm and associated magnet positioned on each respective shaft cannot come into direct contact with each other arm/magnet.

7. Apparatus as claimed in claim 5 wherein a plurality of secondary shafts are spaced evenly around a central primary shaft and such that the or each arm and associated magnet positioned on each respective secondary shaft cannot come into direct contact with the arm/magnets of any other secondary shaft or those arm/magnets of the primary shaft.

8. Apparatus as claimed in claim 1 wherein the mass is positioned at an upper end of the or each secondary shaft.

9. Apparatus as claimed in claim 1 wherein the secondary shaft is fitted with a second magnetic means oriented so as to vertically support the weight of the shaft (and any attachments/fittings thereto) above the alternating or generating device.

10. Apparatus as claimed in claim 9 wherein the second magnetic means comprises at least two annular magnetic discs, a first disc being positioned on the secondary shaft, and a second other disc being positioned intermediate the first disc and the alternating or generating device, and wherein the discs are oriented so as to provide a repulsive magnetic force between them.

11. Apparatus as claimed in claim 10 wherein the second disc is supported at a support, a predetermined height above surrounding ground.

12. Apparatus as claimed in claim 1 wherein the primary shaft and the secondary shaft each have a peripheral ring of magnets arranged at one end respectively thereof, with one of the peripheral rings being positionable within or adjacent to the other peripheral ring to transfer rotation from the primary shaft to the secondary shaft.

13. Apparatus as claimed in claim 12 wherein one of the shafts additionally has a central magnet at the end thereof which is located centrally within the ring.

14. Apparatus as claimed in claim 1 wherein one of the primary or secondary shafts has a motive mechanism associated therewith for transferring a motive force to or receiving a motive force from another source.

15. Apparatus as claimed in claim 14 wherein the motive mechanism is a screw mechanism and the other source is a fluid that can engage with the screw mechanism to be driven thereby or to drive the same.

16. Apparatus as claimed in claim 15 wherein the fluid is a liquid, a gas or a flowable solid.

17. Apparatus as claimed in claim 15 wherein the motive mechanism is located within an elongate housing through which the fluid flows.

18. Apparatus as claimed in claim 1 wherein the primary shaft is elongate having a longitudinal axis, with a plurality of elongate secondary shafts, each having a longitudinal axis parallel or inclined to the primary shaft axis and to each other secondary shaft axis, being arranged in series adjacent to and extending away in the series from the primary shaft.

19. Apparatus as claimed in claim 18 wherein the magnetic means in the primary and secondary shafts can be oriented such that, when the primary shaft rotates in one direction, the first adjacent secondary shaft rotates in an opposite direction, the next adjacent secondary shaft rotates in a further opposite direction (which is the same direction of rotation as the primary shaft), and so on.

20. Apparatus as claimed in claim 18 wherein the magnetic means can be oriented such that the primary shaft and all secondary shafts rotate in the same direction.

21. Apparatus as claimed in claim 18 wherein one primary shaft is associated with two secondary shafts to define a combination, and the magnetic means is oriented such that the secondary shafts in the combination rotate in the same direction, and a plurality of such combinations are arranged in series so that the secondary shafts of each combination are in series, and axes of all the secondary shafts in all of the combinations are parallel or inclined.

22. Apparatus as claimed in claim 1 wherein the magnetic means on the primary shaft is spaced from a longitudinal axis thereof by a different distance to the spacing of the magnetic means from a longitudinal axis of the secondary shaft(s).

23. Apparatus as claimed in claim 1 wherein the primary shaft and the secondary shaft each have a peripheral ring of magnets arranged at one end respectively thereof, with one of the peripheral rings being alignable with an outer lateral face of the other peripheral ring to transfer rotation from the primary shaft to the secondary shaft.

24. Apparatus as claimed in claim 23 wherein a longitudinal axis of the primary shaft is orthogonal to a longitudinal axis of the secondary shaft.

25. Apparatus for inducing drive including a primary drive shaft and one or more secondary drive shafts, the primary shaft and secondary shaft(s) each fitted with magnetic means oriented such that, when the primary shaft is rotated, the or each secondary shaft is caused to rotate due to magnetic forces, with the secondary shaft(s) each being fitted with an additional mass to increase its rotational inertia.

26. Apparatus for inducing drive including a primary drive shaft and a plurality of secondary drive shafts arranged around the primary drive shaft, the primary shaft and the secondary shafts each fitted with magnetic means oriented such that when the primary shaft is rotated the secondary shafts are caused to rotate due to magnetic forces, and wherein each secondary shaft is fitted with an additional mass to increase its rotational inertia.

27. Apparatus for inducing drive including a primary drive shaft and one or more secondary drive shafts, the primary shaft and secondary shaft(s) each fitted with magnetic means oriented such that when the primary shaft is rotated, the or each secondary shaft is caused to rotate due to magnetic forces, wherein the primary shaft and the secondary shaft each have a peripheral ring of magnets arranged at one end respectively thereof, with one of the peripheral rings being positionable within or adjacent to the other peripheral ring to transfer rotation from the primary shaft to the secondary shaft, and one of the shafts additionally having a central magnet at the end thereof which is located centrally within the ring.

28. Apparatus for inducing drive including a primary drive shaft and a plurality of secondary drive shafts arranged around the primary drive shaft, the primary shaft and the secondary shafts each fitted with magnetic means oriented such that when the primary shaft is rotated the secondary shafts are caused to rotate due to magnetic forces, wherein the primary shaft and the secondary shaft each have a peripheral ring of magnets arranged at one end respectively thereof, with one of the peripheral rings being positionable within or adjacent to the other peripheral ring to transfer rotation from the primary shaft to the secondary shaft, and one of the shafts additionally having a central magnet at the end thereof which is located centrally within the ring.

29. Apparatus for inducing drive including a primary drive shaft and one or more secondary drive shafts, the primary shaft and secondary shaft(s) each fitted with magnetic means oriented such that, when the primary shaft is rotated, the or each secondary shaft is caused to rotate due to magnetic forces, and wherein one of the primary or secondary shafts has a screw mechanism associated therewith for transferring a motive force to or receiving a motive force from a fluid that can engage with the screw mechanism to be driven thereby or to drive the same.

30. Apparatus for inducing drive including a primary drive shaft and a plurality of secondary drive shafts arranged around the primary drive shaft, the primary shaft and the secondary shafts each fitted with magnetic means oriented such that when the primary shaft is rotated, the secondary shafts are caused to rotate due to magnetic forces, and wherein one of the primary or secondary shafts has a screw mechanism associated therewith for transferring a motive force to or receiving a motive force from a fluid that can engage with the screw mechanism to be driven thereby or to drive the same.

31. Apparatus for inducing drive including a primary drive shaft and two or more secondary drive shafts to define a combination, the primary shaft and secondary shafts each fitted with magnetic means oriented such that when the primary shaft is rotated, each secondary shaft is caused to rotate in the same direction due to magnetic forces, wherein the primary shaft is elongate having a longitudinal axis, with the secondary shafts in the combination also being elongate and each having a longitudinal axis parallel or inclined to the primary shaft axis and to each other secondary shaft axis, a plurality of such combinations being arranged in series so that the secondary shafts of each combination are in series, and axes of all the secondary shafts in all of the combinations are parallel or inclined.

32. Apparatus for inducing drive including a primary drive shaft and a plurality of secondary drive shafts arranged around the primary drive shaft to define a combination, the primary shaft and the secondary shafts each fitted with magnetic means oriented such that when the primary shaft is rotated, each secondary shaft is caused to rotate in the same direction due to magnetic forces, wherein the primary shaft is elongate having a longitudinal axis, with the secondary shafts in the combination also being elongate and each having a longitudinal axis parallel or inclined to the primary shaft axis and to each other secondary shaft axis, a plurality of such combinations being arranged in series so that the secondary shafts of each combination are in series, and axes of all the secondary shafts in all of the combinations are parallel or inclined.

33. Apparatus for inducing drive including a central primary drive shaft and a plurality of secondary drive shafts spaced evenly therearound, the primary shaft and secondary shaft(s) each fitted with a permanent magnet or electromagnet positioned on each of one or more arms which extend radially out from each of the primary and secondary drive shafts and oriented such that, when the primary shaft is rotated, the or each secondary shaft is caused to rotate due to magnetic forces, wherein the or each arm and associated magnet positioned on each respective secondary shaft cannot come into direct contact with the arm/magnets of any other secondary shaft or those arm/magnets of the primary shaft.

34. Apparatus for inducing drive including a primary drive shaft and a plurality of secondary drive shafts arranged around the primary drive shaft, the primary shaft and secondary shaft(s) each fitted with a permanent magnet or electromagnet positioned on each of one or more arms which extend radially out from each of the primary and secondary drive shafts and oriented such that, when the primary shaft is rotated, the or each secondary shaft is caused to rotate due to magnetic forces, wherein the or each arm and associated magnet positioned on each respective secondary shaft cannot come into direct contact with the arm/magnets of any other secondary shaft or those arm/magnets of the primary shaft.

* * * * *

UNITED STATES PATENT AND TRADEMARK OFFICE
CERTIFICATE OF CORRECTION

PATENT NO. : 7,024,963 B2 Page 1 of 1
APPLICATION NO. : 10/399126
DATED : April 11, 2006
INVENTOR(S) : Andrew French It is certified that error appears in the above-identified patent and that said Letters Patent is hereby corrected as shown below:

Title Page
Item [30] Foreign Application Priority Data:

"March 3, 2001"    should be    --March 23, 2001--

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 7,024,963 B2
APPLICATION NO. : 10/399126
DATED : April 11, 2006
INVENTOR(S) : Andrew French It is certified that error appears in the above-identified patent and that said Letters Patent is hereby corrected as shown below:

In the Claims:

At Column 12, line 8, "above the" should be -- above an --,

At Column 12, lines 37 to 38, "is a" should be -- is one of a --,

At Column 12, line 38, "gas or a" should be --gas and a --.

Signed and Sealed this

Ninth Day of January, 2007

JON W. DUDAS
*Director of the United States Patent and Trademark Office*